(12) United States Patent
Quinones et al.

(10) Patent No.: US 6,183,826 B1
(45) Date of Patent: Feb. 6, 2001

(54) COLORED CELLULOSIC CASING WITH CLEAR CORRIDOR

(75) Inventors: Xavier Jose Quinones, Chicago; Jeffrey Brian Sherry, Downers Grove; James Richard Hansen, Tinley Park, all of IL (US)

(73) Assignee: Viskase Corporation, Chicago, IL (US)

( * ) Notice: Under 35 U.S.C. 154(b), the term of this patent shall be extended for 0 days.

(21) Appl. No.: 07/898,373

(22) Filed: Jun. 9, 1992

Related U.S. Application Data (63) Continuation of application No. 07/564,928, filed on Aug. 8, 1990, now abandoned.

(51) Int. Cl.⁷ .................................................. A22C 13/00
(52) U.S. Cl. .................... 428/34.8; 428/35.2; 428/36.4; 428/36.9; 428/195; 426/105; 426/129; 138/118.1
(58) Field of Search ....................... 426/105, 125, 426/129; 8/518; 428/35.2, 36.4, 36.9, 195, 34.8; 138/118.1

(56) References Cited

U.S. PATENT DOCUMENTS

| | | | |
|---|---|---|---|
| 2,141,776 | 12/1938 | Vautier et al. | 138/145 |
| 2,227,682 | 1/1941 | Wade | 264/173 |
| 2,803,041 | 8/1957 | Hill et al. | 18/12 |
| 3,334,168 | 8/1967 | Majewski et al. | 264/173 |
| 4,336,828 * | 6/1982 | Balser et al. | 427/230 |
| 4,356,199 * | 10/1982 | Hammer et al. | 428/503 |
| 4,990,401 | 2/1991 | Renalls | 428/403 |
| 4,995,927 | 2/1991 | Garrett | 156/152 |

FOREIGN PATENT DOCUMENTS

603307 * 8/1960 (CA) .
8708867 * 10/1987 (DE) .

* cited by examiner

Primary Examiner—Rena L. Dye
(74) Attorney, Agent, or Firm—Cedric M. Richeson (57) ABSTRACT

A sausage casing comprising an elongated cellulosic tube having less than about 100 wt. % moisture based upon the bone dry weight of cellulose and having first and second longitudinal portions, and a colorant or opacifier which is longitudinally and continuously dispersed throughout the wall of at least one of these portions to provide it with different optical properties which are useful e.g., for quality control and identification of color development, meat type and particle definition and/or to provide an attractive package appearance. In a preferred embodiment, a sausage is encased where the surface area of the second portion is less than or equal to the first portion and these portions are visually different having measurable L,a,b and opacity values such that:

i) an average opacity value of the first portion is at least about 0.5 greater than that for the second; or ii) the difference in average opacity between the first and second portions is less than 10, and a difference of at least about 5 exists between the first and second portions in their L,a, or b values; or iii) there is a difference of at least about 10 in average opacity between the first and second portions, and the sum of the absolute values of a and b of the first portion is at least 10.

65 Claims, 2 Drawing Sheets

FIG. 1

COLORED CELLULOSIC CASING WITH CLEAR CORRIDOR

This application is a Continuation of prior U.S. application Ser. No. 07/564,928 Filing Date Aug. 8, 1990, now abandoned.

The present invention relates to cellulosic food casings, such as sausage casings and the optical properties and visual appearance thereof.

Food casings used in the processed food industry are generally thin-walled tubing of various diameters prepared from regenerated cellulose, cellulose derivatives, and the like.

In general, cellulosic food casings have multifunctional uses in that they may be employed as containers during the processing of the food product encased therein and also serve as a protective wrapping for the finished product. In the sausage meat industry, the preparation of various types of sausages such as frankfurters in a variety of sizes usually involves removing the casing from about the processed meat prior to final packaging. These sausages from which casing is usually removed are generally processed in nonfiber-reinforced (nonfibrous) cellulose casing. However, larger diameter sausages such as salami are frequently sold with the casing left on. These sausages are usually packaged in fiber-reinforced (fibrous) cellulosic casing.

In the manufacture of nonfibrous regenerated cellulose sausage casings, viscose is typically extruded through an annular die into a coagulating and regenerating bath to produce a tube of regenerated cellulose. This tube is subsequently washed, plasticized e.g. with glycerine, and dried e.g. by inflation under substantial air pressure. After drying, the casing is wound on reels and subsequently shirred on high-speed shirring machines, such as those described in U.S. Pat. Nos. 2,984,574, 3,451,827 3,454,981; 3,454,982; 3,461,484; 3,988,804 and 4,818,551. In the shirring process, lengths of from about 40 to about 200 feet of casing are typically compacted (shirred) into tubular sticks of between about 4 and about 30 inches. The shirred casing sticks are packaged and provided to the meat processor who typically causes the casing sticks to be deshirred at extremely high speeds while stuffing the deshirred casing with a meat emulsion. The meat can be subsequently cooked and the casing removed from the meat processed therein with high-speed peeling machines.

For fibrous casing, a process of manufacture similar to that for nonfibrous casing is employed, however, the viscose is extruded onto one or both sides of a tube which is usually formed by folding a web of paper so that the opposing side edges overlap. In production of fibrous casing the viscose impregnates the paper tube where it is coagulated and regenerated to produce a fiber-reinforced tube of regenerated cellulose. The fibrous or paper reinforcement is generally utilized in tubular casing having diameters of about 40 mm or more in order to provide dimensional stability particularly during stuffing with meat emulsion. Production of both nonfibrous and fibrous casing is well-known in the art and the present invention may utilize such well known processes.

Cellulosic casings are typically humidified to a level sufficient to allow the casing to be shirred without undue breakage from brittleness yet humidification must be at a level low enough to prevent undue sticking of the casing to the shirring equipment e.g. the mandrel during the shirring operation. Often a humectant is employed to moderate moisture retention and casing swelling to produce a casing which during the shirring operation has sufficient flexibility without undue swelling or stickiness. Typically, a lubricant such as an oil will also be used to facilitate passage of the casing through the shirring equipment e.g. over a shirring mandrel.

It has been useful to lubricate and internally humidify cellulose casings during the shirring process by spraying a mist of water and a lubricant through the shirring mandrel. This is an economical, fast and convenient way to lubricate and/or humidify the casing to increase the flexibility of the casing and facilitate high speed shirring without undue detrimental sticking, tearing or breakage of the casing.

Cellulosic food casings suitable for use in the present invention will have a moisture content of less than about 100 wt. % based upon the weight of bone dry cellulose (BDC). The term "bone dry cellulose" as used herein refers to cellulose such as regenerated cellulose and/or paper which has been dried by heating the cellulose in a convection oven at 160° C. for one hour to remove water moisture. In the formation of cellulosic casing e.g. by the viscose process, regenerated cellulose forms what is known as gel stock casing having a high moisture content in excess of 100 wt. % BDC. This gel stock casing is unsuitable for stuffing with food such as meat emulsion, e.g. to form sausages, because it has insufficient strength to maintain control of stuffing diameter and prevent casing failure due to bursting while under normal stuffing pressure. Gel stock casing is typically dried to a moisture level well below 100 wt. % (BDC) which causes the regenerated cellulose to become more dense with increased intermolecular bonding (increased hydrogen bonding). The moisture level of this dried casing may be adjusted, e.g. by remoisturization, to facilitate stuffing. Such remoisturization or moisture adjustment, e.g. by drying to a specific level, for nonfibrous casing is typically to a level with a range of from about 5 to about 40 wt. % BDC. Small diameter nonfibrous casing, prior to shirring, will have a typical moisture content of about 10–20 wt. % BDC, and such small diameter nonfibrous casing when shirred will have a moisture content that has been adjusted to between about 20 to 40 wt. % BDC.

For fibrous casing, casing is commercially produced having a moisture content ranging from about 4 wt. % BDC to about 70 wt. % BDC. Typically, fiber-reinforced casing having a moisture level between about 4 to about 25 wt. % BDC will be soaked prior to stuffing by a food processor. Premoisturized, ready-to-stuff, fibrous casing is also commercialized. Premoisturized fibrous casing which does not require additional soaking or moisturization will typically have a moisture content of from about 26 to about 70 wt. % BDC.

In the formation of skinless (casing removed) frankfurters, sausage proteins coagulate, particularly at the sausage surface, to produce a skin and allow formation of a liquid layer between this formed skin and the casing as described in U.S. Pat. No. 1,631,723 (Freund). In the art the term "skinless frankfurter" is understood to mean that the casing is or is intended to be removed and that such casing may be removed because of formation of a secondary "skin" of coagulated proteins on the surface of the frankfurter. This secondary skin forms the outer surface of the so called "skinless frankfurters". Skin formation is known to be produced by various means including the traditional smoke curing with gaseous smoke, low temperature drying, application of acids such as citric acid, acetic acid or acidic liquid smoke or combinations thereof. Desirably, this secondary skin will be smooth and cover the surface of the frankfurter. Formation of a liquid layer between the casing and the frankfurter skin relates to the meat emulsion formulation, percent relative humidity during the cooking environment, subsequent showering and steam application to the chilled frankfurter.

During the traditional smoke curing process, the outer surface of the frankfurter will be colored by interaction with the gaseous smoke. This coloration is visually perceptible. When a processor uses a typical clear casing which is made from the viscose process without addition of pigments for coloration, then this smoke coloration of the frankfurter surface may be seen through the casing. In this manner, the curing and coloration of gaseous smoked sausages may be followed by observing through the casing visual changes, such as the increased darkening or browning of the sausage surface, which take place during smoking. Similarly, pink or red color development caused e.g. by contact with acid such as by acid showering may be seen through clear casing as may development of smoke coloration utilizing liquid smoke treated casing. Operators may utilize these visual indications to adjust process parameters or to verify operability or effectiveness of process conditions.

When nonfibrous casing is removed from the meat mass, there is occasionally a tendency for the casing to incompletely peel away from the encased meat. Occasionally, portions of casing may remain with the meat after peeling. In particular, following the peeling operation, entire links may remain unpeeled, bands of casing may remain encircling a product, or segments of casing of various shapes and/or sizes may remain on the sausage. Nonfibrous casing of regenerated cellulose is typically transparent and very clear in appearance. This clarity allows processors to see the encased product, but disadvantageously hampers identification of individual unpeeled links or peeled links having segments of casing attached thereto.

Also, in a typical stuffing operation the initial and final links formed from stuffing out a shirred length of casing are often nonuniform in length, weight and/or appearance. The stuffing machine operator typically will remove nonuniform links from both ends of a stuffed out length of casing. The front or initially stuffed end of the casing typically has a closure which may be nothing more than the casing twisted back upon itself. The operator may cut off this closure and use his fingers to squeeze or strip out the meat emulsion from the nonuniform links into a strip-out tub. The stripped out casing may then be trimmed to a suitable length for either tying to a length of similarly stuffed out casing or for folding back over the remaining uniform links whereupon the casing may be twisted about the casing at an already existing twisted portion which acts to separate links. This tying or twisting is performed in order to prevent movement of meat emulsion through an open end.

The operator performs a similar operation on the back end of the stuffed length with respect to the final links formed. Typically the stuffing machine will stop pumping meat emulsion just prior to reaching the end of the shirred length of casing. The operator will then use a ring knife to cut off the unstuffed portion of casing which is discarded, then strip out the meat emulsion from any nonuniform links into a strip-out tub and then either tie or fold and twist a suitable length of casing from the stripped out end back over the remaining chain of encased sausages in order to seal the end and maintain the uniformity of the remaining links as was done for the front end of the stuffed casing. A strip out operation may also be performed in the middle of an operation which stuffs out a length of casing. This is usually done when a breakage occurs or some other defect arises which produces nonuniform links.

The meat deposited in the strip-out tub may be discarded, but it is often recycled by placing it back in the stuffer for restuffing into casing. Occasionally, trimmed closures or portions of casing may inadvertently fall or be placed in the strip-out tub. Normally clear casing e.g. of regenerated cellulose may easily go unseen and be placed back in the stuffer for restuffing which leads to defective products contaminated with pieces of casing.

In order to assist the operator's identification of such problems as unpeeled links, links having casing segments attached thereto, and casing which may have been improperly admitted to a strip-out tub, casing manufacturers have provided processors with colored casing. One type of such colored casing is a transparent blue nonfiber-reinforced regenerated cellulosic casing manufactured by Viskase Corporation of Chicago, Ill. and made commercially available under the brand designation SENTRY NOJAX. This casing is completely colored with a substantially uniform blue color. The blue is produced by a water-insoluble pigment incorporated into the viscose prior to annular extrusion and regeneration. This casing is very visible and facilitates the ability of both the stuffer operator and peeler operator to identify casing contamination of the strip out tub and incomplete peeling.

Disadvantageously, the use of such colored casing makes it difficult if not impossible for an operator to obtain a visual indication of the progress of the smoking process without removing the casing because the casing color obscures the progressive coloration of the sausage surface during smoking. Instead, the operator must peel the casing off the encased product to see how much the coloration of the sausage surface has progressed.

In order to maintain an ability to follow smoke color development during processing while concurrently making the casing more visible to stuffer and peeler operators, some processors have utilized striped casing. Casing manufacturers sell clear regenerated cellulosic nonfibrous casing having one or more longitudinal opaque stripes. These stripes are typically added by injecting pigment (contained in a viscose carrier) into the main stream of viscose immediately prior to admission of the viscose into the extrusion die and the regeneration process. Striped casing is generally utilized by processors to differentiate encased products either by stripe number or color e.g. a single stripe or black stripe may indicate an all-beef product while two stripes or a white stripe may indicate a beef-pork blend. However, aside from use of the striped casing for such product identification, it has also been used in the past to assist operators in detecting the presence of casing in unwanted locations e.g. in the strip-out tub or segments of casing on peeled sausages. Such striped casing has generally been provided in various opaque colors and more typically in black and white. The thickness of individual stripes has generally been about $3/32$ inch, but has varied up to $1/4$ inch on some casings. An eight stripe casing having a circumference of about 3.44 inches and a stripe width of up to about $5/32$ inch has been commercialized as has a four stripe casing of about 2.22 inch circumference with a stripe width between about $1/8$ and $1/4$ inch.

Disadvantageously, striped casing is expensive to produce and the stripe injector is subject to clogging, requiring frequent maintenance. Use of striped casing to detect contamination of meat with casing in the strip-out tub and to identify sausages having segments of unpeeled casing has the disadvantage of using casing in which typically more than 50 percent of the casing surface is clear regenerated cellulose. This large proportion of clear casing area increases the likelihood that either a clear segment of casing may be left on a peeled sausage or in the strip-out tub, or that so little of the stripe is present that the casing segment is overlooked by the operator who may have only seconds for inspection. As noted above, additional stripes may be added, but this increases the complexity of the striping apparatus, increases maintenance; reduces reliability and increases the cost of manufacture of the casing.

Other colored casings, both nonfibrous and fibrous, are known in the art. Dyed food casings are known. For example, U.S. Pat. No. 4,769,246 discloses dyed collagen casings; U.S. Pat. No. 4,038,438 discloses dyed food casings including casings of regenerated cellulose; U.S. Pat. No. 3,695,904 discloses coloring unreinforced and reinforced cellulosic casings with coloring agents while the casing is in the gel state. U.S. Pat. No. 2,521,101 (Thor et al.) discloses production of dyed cellulose casings made by passing gel stock casing through a bath containing glycerine and a dye. U.S. Pat. No. 1,959,980 (Henderson et al.) discloses regenerated cellulose films or tubes which are dyed or colored only on one side (inner or outer) or which have one color on the inside of the tube and a different color on the outside of the tube.

Self-coloring casings are also known as disclosed in U.S. Pat. Nos. 2,301,564; 2,477,767 and 2,521,101. These casings are designed to transfer color to the sausage surface. Such casings are generally either coated or impregnated with food grade water-soluble dyes and have also been made commercially available with nontransferable black or white opaque stripes. Also, liquid smoke impregnated casings are known to transfer liquid smoke to the surface of sausages encased therein causing a coloring reaction on the sausage surface. Casings having either nontransferable or transferable indicia, logos, words are also known e.g. U.S. Pat. Nos. 1,959,978; and 4,917,924.

A window dyed casing has also been disclosed in U.S. Pat. No. 2,857,283. This patent discloses use of masking means on tubing prior to subjecting a clear tubing to a dye or combination of chemicals which may develop color. The masking means prevent coloration of the masked portion by chemical or mechanical means to produce a seamless casing having a clear longitudinal portion through which the contents of the casing can be visually examined. A casing in which the major area of its outer surface is dyed is disclosed. Such dye is applied to the surface only and does not extend throughout the thickness of casing wall and such dye is only applied to the casing after formation of the tube.

Fibrous casing is generally used on larger diameter sausages such as salami and thuringer products and the casing is generally left on, although it may be removed, particularly for sale of prepackaged sliced products. Traditionally, fibrous encased products utilized colored casings. Salami-type products frequently employ brownish or mahoganey colors by custom. Striped fibrous casings have not been used, although a darker longitudinal "seamed" portion is often present in fibrous casing due to an overlap of the fibrous paper made during manufacture of the casing. Clear fibrous casing is also sold, but this product is typically peeled off the sausage prior to retail sale. The clear fibrous casing is readily visible on a sausage product because it has a generally greater opacity than clear nonfibrous casing. Nonetheless, clear fibrous casing does allow one to easily see meat particle definition and visually determine coarse versus fine ground particles and to also differentiate between fat and lean particles, as well as between different emulsions such as beef versus turkey. Particle definition may also be seen through some colored fibrous casing although with greater difficulty than is present with clear casings. Consumers may perceive quality differences with respect to such sausage characteristics as particle definition and fat/protein make up of the sausage. Such perceptions and consumer preferences make it desirable to provide packaging which allows a consumer to see such characteristics.

SUMMARY OF THE INVENTION

The present invention seeks to provide a cellulosic casing and encased food product whereby the casing may advantageously have at least two longitudinal portions with different optical properties. In a most preferred embodiment of the invention a clear colorless, longitudinal portion is provided in an otherwise colored casing to allow either a manufacturer to view the encased product e.g. for color development during processing or a consumer to view the encased product e.g. for meat particle definition and quality. In this preferred embodiment the colored portion of the casing makes up an equal or greater surface area of casing relative to the clear portion in order to assist the manufacturer in quality control. This colored portion helps ensure that casing or casing segments are not mixed with meat emulsion for admission to the feed hopper of a stuffing machine e.g. by contamination of meat in the strip-out tub with casing. The colored portion of the casing also helps identify unpeeled or partially unpeeled casing. Other embodiments of the invention provide casing having multicolored longitudinal portions or portions having different opacities to help differentiate one encased product from another and to provide attractive packaging for applications where the casing is left on until ultimate use by a consumer. Clear or relatively transparent colored or colorless portions may be provided to allow visual identification of product type and quality.

These aforementioned advantages may be provided according to the present invention by a novel cellulosic food casing comprising an elongated cellulosic tube having a moisture content less than 100 wt. % based upon the weight of bone dry cellulose (BDC). This cellulosic casing tube has first and second longitudinal portions and a colorant or opacifier which is longitudinally and continuously dispersed in at least one of the portions, throughout the tube wall, to provide that portion with optical values which are different from the other portion. For example, a colorant or opacifier may be used in only one portion and not the other, or different colorants or opacifiers may be used or different amounts of the same colorant or opacifier may be used. Also, multiple colorants or opacifiers may be used in the first and/or the second longitudinal portions and the first and second longitudinal portion may each individually comprise a plurality of adjacent longitudinal portions or may consist essentially of a single longitudinal portion. According to the present invention the first and second portions will have a surface area ratio of the first portion to the second portion of at least about 1:1 or greater. Also, the first and second portions may have L, a, b and opacity values which meet at least one of the following conditions:

i) an average opacity value of said first portion that is at least about 0.5 greater than the average opacity value of said second portion;

ii) a difference in average opacity between said first portion and said second portion which is less than 10, and a difference of at least about 5 between said first and second portions in their respective averages of either said L values or said a values or said b values; or iii) a difference of at least about 10 or greater in average opacity between said first portion and said second portion, and the sum of the absolute values of a and b of the first portion following extraction of the casing with water and methanol is at least 10.

The above casing may be stuffed with a food product such as a meat emulsion of e.g. beef, pork, turkey, chicken, fish or mixtures thereof, or with a dairy product such as cheese or with a vegetable product such as soybean-derived protein or tofu. It is contemplated that mixtures of animal and vegetable products may be encased and that these products may be cooked or uncooked, pasteurized, fermented, frozen, dried or processed in any of a variety of well-known ways of processing food. A particularly desirable form of the invention is an encased meat sausage, and a most advantageous use and embodiment of the invention is on frankfurter-type sausage encased in a nonfibrous casing of regenerated cellulose.

The term "colorant" as used herein refers to any substance that imparts color to another material or mixture and applies to black and white as well as actual colors. Colorants may be either dyes or pigments and either water-soluble or water-insoluble. Preferred colorants are pigments which are preferably water-insoluble and approved for use in food contact applications.

DETAILED DESCRIPTION OF THE INVENTION

The invention is a cellulosic food casing suitable for encasing sausages and having novel optical properties. The invention is particularly useful in quality control and product identification during manufacture of encased food products and for quality and product identification by retailers and consumers following manufacture. The invention may also be useful in market promotion of the encased product by providing an economical multicolored single sausage or string of sausage package.

The novel optical properties of the present invention may be provided by addition of one or more colorants and/or opacifiers to one or more longitudinal portions of a cellulosic casing throughout the wall of the casing portion such that the casing will have at least two longitudinal portions which have distinctly and visually perceptibly different optical properties.

The casings employed by the present invention may be made of any suitable material including seamless or seamed tubular films, but preferably comprises cellulosic casings e.g. the well-known regenerated cellulose casing manufactured by the viscose process. Both casings with and without fiber or paper reinforcement are useful in the invention. The manufacture of nonfiber-reinforced (nonfibrous) and fiber-reinforced (fibrous) casings is well known in the art and one of ordinary skill is aware of the common variations in such parameters as moisture content, type of paper or fiber reinforcement (if any), type and amounts of such additives as plasticizers, antimycotics, etc. Such casings are typically gathered into shirred sticks as described above using well known processes and equipment. During the shirring operation it is common to coat the casing, particularly the inner surface of a tubular casing (e.g. by spraying), with a composition termed a shirr solution which may contain such ingredients as an anti-pleat lock agent, a lubricant, a surfactant, water and/or a humectant. Casings may also be treated with tar-containing or tar-depleted liquid smokes and a tar-depleted liquid smoke treated casing may be made e.g. in the accordance with the teaching of U.S. Pat. No. 4,540,613.

The moisture content of suitable casings for the present invention is as described above for known fibrous and nonfibrous casings. Moisture content may be measured using the well-known Karl-Fischer method for moisture analysis, and moisture is expressed as percentage of the bone dry cellulose content of the casing.

In the manufacture of nonfibrous regenerated cellulose casings by the viscose process, typically viscose is extruded through an annular die into a coagulating and regenerating bath to produce a tube of regenerated cellulose. This tube is subsequently washed, plasticized e.g. with glycerine, and dried e.g. by inflation under substantial air pressure. After drying, the casing is wound on reels and subsequently may be shirred. Fibrous casing employs a similar process of manufacture, however, the viscose is coated on one or more sides of a tube which is generally formed by folding a web of paper so that the opposing side edges overlap. The viscose impregnates the paper tube where it is coagulated and regenerated to produce a fiber-reinforced tube of regenerated cellulose.

Figure 1:
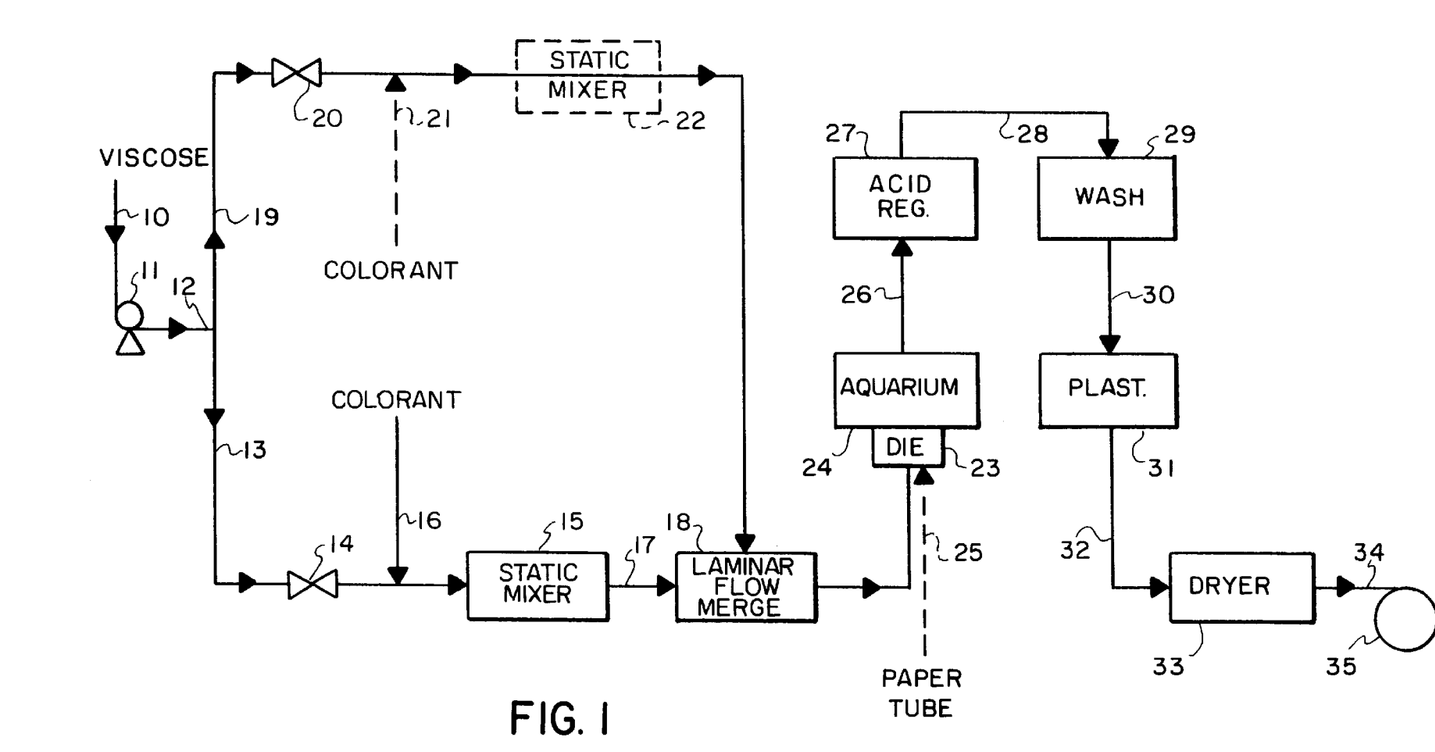
FIG. 1 is a schematic representation of a process for making a casing according to the present invention.

Referring now to FIG. 1, viscose is introduced by transfer means such as pipe 10 and pumping means such as pump 11 to means for splitting a stream of viscose into multiple streams such as a T-pipe 12. From T-pipe 12, a first portion of viscose is conveyed via transfer means such as pipe 13 through control means such as control valve 14 to mixing means such as static mixer 15. Prior to or concurrent with transfer of viscose to the static mixer 15, a colorant or opacifier is controllably added e.g. by metering into the viscose stream a colorant via transfer means such as a pipe 16. The static mixer thoroughly mixes the colorant with the viscose stream and the viscose, which is now optically modified e.g. by being uniformly dispersed with an added pigment, is conveyed by transfer means such as pipe 17 in a state of laminar flow to laminar flow merge means 18 where the flow of pigmented viscose from static mixer 15 is merged with a second portion of viscose conveyed by transfer means such as pipe 19 through control means such as control valve 20 and into the laminar flow merge means 18.

Optionally, a different colorant or opacifier, or different amount of the same colorant or opacifier may be added (e.g. by metering through transfer means such as pipe 21) to the second portion of viscose prior to conveyance to laminar flow means 18. The optical property modifying agent such as a colorant may be added to the second portion of viscose either prior to or concurrent with transfer of the viscose to mixing means such as static mixer 22.

The laminar flow merge means 18 is a conduit having a plurality of passageways, typically of circular cylindrical shape, which merge together into a single passageway. This merge means 18 acts as a manifold or header to merge the first portion of viscose and the second portion of viscose into a single stream under laminar flow conditions to prevent or minimize any mixing between the first and second portion of viscose.

The relative amounts of the first portion of viscose to the second portion of viscose may be adjusted by controlling the relative volumes admitted to the merging manifold by adjusting valves 14 and 20. Of course, the process may be modified to add a one or more additional streams of viscose which may or may not contain optical property modifying agents to produce a laminar flow of three or more distinct portions.

Laminar flow merge means 18, such as a manifold, cause the viscose streams to be merged immediately prior to admission of the viscose to an annular extrusion die or nozzle 23 which immediately opens into coagulation and regeneration means such as a tank hereinafter referred to as an aquarium 24 containing an acid such as sulfuric acid which initiates and causes coagulation and regeneration. The aquarium may also contain agents to modify the rate of regeneration, such as metal salts, as is well known in the art. Preferably, the viscose stream will be merged within a foot of the nozzle and the merged laminar flowing stream will be admitted to the nozzle at a right angle to the axis of the nozzle annulus.

Optionally, a fiber web of e.g. paper 25 may be shaped into a tube and admitted to die 23 where the viscose is extruded onto the paper as it enters the aquarium. Different dies are used for production of nonfibrous and fibrous casing and suitable dies are well known in the art.

Extrusion of viscose through die 23 into the aquarium 24 produces a partially coagulated and regenerated tubular cellulosic article which is conveyed by transfer means 26 to additional acid regeneration means 27 such as one or more consecutive tubs of acid. The tube of regenerated cellulose is then conveyed by transfer means 28 to washing means 29 such as one or more consecutive tubs of water which may also contain additives such as caustic e.g. to adjust pH. The washed tube of regenerated cellulose is then typically conveyed by transfer means 30 to plasticizing means 31 such as one or more tubs containing a suitable plasticizing agent such as a glycerine and from the plasticizer means 31, the casing is conveyed via transfer means 32 to drying means 33 such as hot air dryers where the moisture content of the now formed tube of cellulosic casing is adjusted. The dried moisture adjusted casing is conveyed via transfer means 34 to collection means 35 such as a take-up reel or shirring operation. Typical transfer means 26,28,30,32 and 34 may each comprise one or more rollers.

Figure 2:
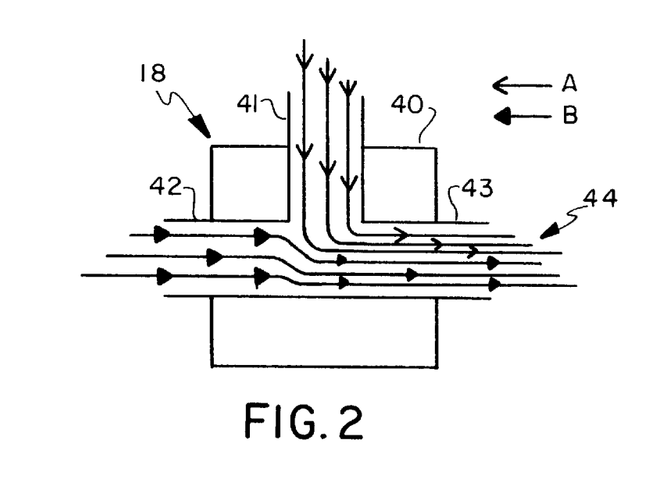
FIG. 2 is a schematic representation of laminar flow within a viscose merger conduit.

Referring now to FIG. 2, a schematic depicts laminar flow in laminar flow merge means 18 such as a manifold 40 having a T-shaped passageway. A first conduit 41 containing a first portion of flowing viscose designated by arrows A merges with a second conduit 42 containing a second portion of viscose designated by arrows B into a single conduit 43. The merged flow of viscose, generally referred to as 44, contains two distinct portions of viscose designated by arrows A and B. The manifold contains two distinct portions of viscose which exit the manifold with minimal mixing due to the laminar flow of the viscose streams A and B. Suitably laminar flow will be within the well known range of Reynolds numbers indicative of laminar flow. The Reynolds number (Re), which is the ratio of inertial to viscose forces within the flow, will preferably be less than about 2000. T and Y shaped passageways are believed suitable to provide merge means conducive to laminar flow without undue mixing.

An alternative method of merging multiple streams would be to admit separate streams of viscose directly to an annular ring die e.g. at opposing locations on the outermost circumferential surface of the ring or at opposing locations on the surface opposite a die surface containing a circular exit slot for extrusion.

Either or both viscose streams A and B may be modified so as to produce optically different portions of casing. In a preferred embodiment of the invention, viscose stream A is unmodified viscose which will upon regeneration, washing and drying produce a transparent and clear longitudinal portion of casing and viscose stream B is modified with a colorant or opacifier, especially preferred is modification by uniformly dispersing in viscose stream B, a water-insoluble pigment such as a copper phthalocyanine blue pigment available in an aqueous dispersion from Daniel Products Company of New Jersey under the brand designation EX 681-121 Phthalo Blue. In an alternative embodiment, different colorants are added to each viscose stream to produce casing having at least two longitudinal portions of different colors.

Figure 3:
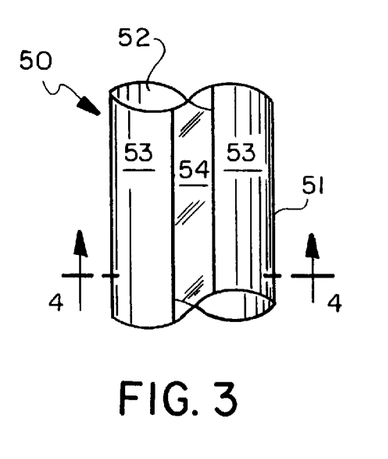
FIG. 3 is a plan view of a segment of the inventive casing.

Referring now to FIG. 3, a plan view is presented of a cut-away segment of a nonfibrous casing 50 made according to the present invention. The casing 50 has an outer surface 51, and an inner surface 52 with a first longitudinal portion 53 which is optically different from a second longitudinal portion 54. The optical differences between the portions may be supplied by any suitable agents, but will most often be due to differences in the type and/or amount of added colorants or opacifiers. These colorants or opacifiers may be added for example, by impregnating the formed casing, but preferably will be added prior to casing formation. With respect to fibrous casing the paper web or tube employed may be treated with colorants and/or opacifiers prior to coating with viscose, but most preferably for both fibrous and nonfibrous casing, the colorants or opacifiers will be added directly to dissolved or modified cellulose, e.g. viscose, prior to regeneration as described above with respect to FIG. 1.

Suitable colorants are any substances which impart color to another material or mixture and the term as used herein applies to substances which impart black and white to another material or mixture as well. Colorants may be either water-soluble or water-insoluble, but preferably are water-insoluble. Also, colorants may be either dyes or pigments, but preferably are pigments. Both dyes and pigments are usually provided in a carrying medium by colorant manufacturers. Dyes are essentially soluble in the carrying medium and maintain little, if any crystalline character. The term "pigment" as it is used herein refers to a colored, black, white or fluorescent particulate organic or inorganic solid which is usually insoluble in, and essentially physically and chemically unaffected by the vehicle or substrate into which it is incorporated. Pigments alter optical properties and appearance by scattering of light and/or selective absorption. Pigments may be provided as a dry powder or as a dispersion in a vehicle or substrate such as water for application. Generally, pigment unlike dyes will maintain its crystalline characteristics or particulate structure while dispersed in a vehicle and during use e.g. by incorporation into or onto a material such as a cellulosic casing.

Suitable pigments may be organic or inorganic, but preferably are organic. Suitable inorganic pigments include metal oxides such as titanium dioxide, suspensions of metal powders, and carbon black. Most preferably, the invention will utilize one or more water-insoluble pigments which have been approved for use in food contact applications by the U.S. Food and Drug Administration (FDA). Preferably the organic pigments will be insoluble in water. Preferred organic pigments include organometallic compounds.

Optical properties and appearances may also be modified using opacifiers. Colorants may also be opacifiers. The term "opacifier" as used herein refers to a material which reduces the transparency or transmission of visible light through the system or substance to which it is added. Opacifiers may be organic or inorganic, water-soluble or water-insoluble and may be added to the casing in the same manner as colorants. Preferably opacifiers will be water-insoluble, inorganic materials added to dissolved cellulose or viscose prior to casing formation.

According to the present invention, a food casing, particularly casings adapted for use in stuffing, processing and/or packaging sausages, is provided as an elongated tube, preferably of cellulose, most preferably of regenerated cellulose, having at least two longitudinal portions which have different optical properties due to the presence of at least one colorant or opacifier in at least one of the longitudinal portions in an amount different from that present in the other portion. Preferably, the colorant or opacifier will be added to one portion and not the other portion so as to provide different optical properties which are readily detected visually by the naked eye and which optical properties have optical values which are measurable and quantifiable by instrumentation.

Figure 4:
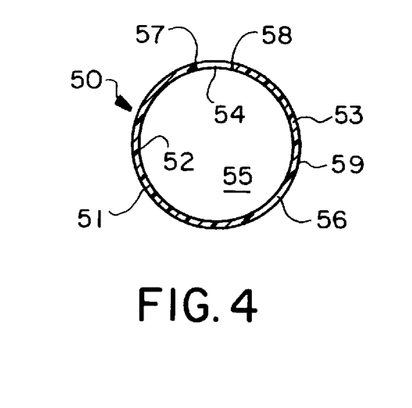
FIG. 4 is a cross-sectional view of the casing of FIG. 3.

Referring now to FIG. 4, a cross-sectional view of the casing segment of FIG. 3, taken along lines 4—4 is depicted. The nonfibrous casing 50 is shown in circular cross-section as it would be if inflated or stuffed with a food product such as sausage emulsion. An encased stuffed sausage would contain a food product such as beef, pork, lamb, fish, poultry or vegetable emulsion or mixtures thereof within the area 55 circumscribed by casing inner surface 52. The casing 50 has a continuous inner surface 52 and a continuous outer surface 51 defining a casing wall 56. For illustration the thickness of the casing wall 56 is exaggerated. Generally, the casing wall thickness for nonfibrous casings will range from about 0.7 to about 4 mils with larger thicknesses being utilized in casings intended to stuff ham and turkey rolls and meat chunk type products. Wieners and frankfurters are typically smaller diameter products which are subjected to extremely fast stuffing and peeling operations and utilize fine ground meat emulsions. These small diameter sausage products are more susceptible to casing contamination caused by strip-out tub contamination and to incomplete peeling in view of the high processing speeds found in industry. Small diameter nonfibrous casings used for stuffing wiener and frankfurter-type products e.g. to make skinless hot dogs will typically have thinner casing wall thicknesses to enable production of shirred casing sticks containing greater lengths of casing. Typically the thickness or width of the casing wall 56 for production of such frankfurter-type sausages will be from about 0.8 to about 2.0 mils, preferably from about 0.9 to about 1.5 mils.

According to the present invention at least two longitudinal portions will be present which have different optical properties, however, more than two portions may also be present. For example, in FIG. 4 casing 50 depicts the most preferred embodiment of the invention consisting essentially of two longitudinal portions having optically different properties viz first longitudinal portion 53, and second longitudinal portion 54. These longitudinal portions 53 and 54 are defined by shared interfacial edges 57 and 58. Moving clockwise around the circumference 59 of casing 50 beginning at interfacial edge 57, the second longitudinal portion 54 extends in cross-section (transverse to the longitudinal direction) from edge 57 to interfacial edge 58, while the first longitudinal portion 53 extends in cross-section (transverse to the longitudinal direction) from edge 58 clockwise following circumference 59 to interfacial edge 57. In the most preferred embodiment, first portion 53 is visually optically uniform and has substantially uniform optical L,a,b and opacity values and second portion 54 is also visually optically uniform and has substantially uniform optical L,a,b and opacity values as explained hereinafter. Such uniformity may vary depending upon quality control and such factors as uniformity of pigment dispersion, presence or absence of varying particle sizes or contaminants and variations in flow rates and volumes which may for example cause fluctuations in casing thickness. Such variations are to be expected and are typically of the range indicated by the data presented in the examples below e.g. in Table B.

It should be further noted that the interfacial edges 57 and 58 should be visually perceptible and preferably form distinct boundaries between the first and second portions. These interfacial edges generally have a width less than about 3/16 inch and preferably a width of less than about 1/16 inch, more preferably less than about 1/32 inch and most preferably less than about 1/64 inch. Wide edges indicate some migration between the merged viscose streams and some viscose migration is acceptable as long as optical differences are maintained according to the parameters described herein. Preferably the edges will be very narrow which is indicative of (a) little migration or mixing, and (b) good laminar flow.

While two longitudinal portions are most preferred, the invention contemplates that three or more longitudinal portion may be provided. For example, in the most preferred embodiment, first portion 53 is colored and slightly opaque by virtue of an added pigmented colorant, while second portion 54 is substantially clear and colorless to the extent of having no added colorants to the ordinary viscose process.

In an alternative embodiment two clear portions 54 may be provided about the circumference 59 of casing 50. For example, a second clear portion similar to portion 54 of the same or different transverse width may be provided at any position about the circumference 59 of casing 50. Addition of other clear portions extends the benefits of being able to view the inner center of the casing, while allowing most of the casing to remain colored to prevent the aforementioned contamination and peeling problems. The benefits of adding one or more additional clear portions increase with the increasing circumference of casing. Generally for small diameter casings such as nonfibrous casing used to produce skinless frankfurters a single clear portion is preferred and no added benefit is achieved by addition of a second clear portion. Although exemplified as "clear", multiple second portions may be provided which are colored or opaque to varying extents in accordance with the invention described herein. Similarly, the first portion may be present as multiple portions as well. It should be further understood that while the first longitudinal portion and second longitudinal portion are preferably, respectively, optically, substantially uniform, these respective first and second portions may each be comprised of a plurality of adjacent contiguous longitudinal sub-portions as long as each sub-portion fulfills the optical value requirements defining the optical difference between the first longitudinal portion and second longitudinal portion. In other words, with respect to surface area, surface area ratios and transverse width of the first longitudinal portion or the second longitudinal portion, contiguous adjacent sub-portions having varying or nonuniform optical properties may be combined to provide the defined areas and distances as long as each sub-portion independently fulfills the defined optical value limitation of the respective parent portion of which it is to be considered a sub-portion. The optical values measured for each of the first and second portions respectively are average values for that portion.

Also, the first and second longitudinal portions of the elongated tubular casing having side edges which preferably extend parallel to each other and most preferably also parallel to the longitudinal axis of the tube, but suitably may also extend helically. The opposing edges defining the width of each longitudinal portion are preferably equidistant from each other along the longitudinal length of casing, but may vary. For example, the side edges may be varied in a periodic fashion to produce a sinosoidal-shaped edge by adjusting relative flow rates of viscose. Such casing may be utilized e.g. in applications where the casing is left on to provide an attractive appearance at point of sale to ultimate consumers.

Also, the relative viscose flows may be adjusted to completely and intermittently close off viscose flow (e.g. from one of two streams) to produce intermittent longitudinal portions. This may also be done using valves. The longitudinal portions should be of sufficient length to provide measurable and visually perceptible optical differences. Preferably, the longitudinal portion will extend along the length of the tube for a distance greater than the transverse width of the longitudinal portion. Preferably, the first and second longitudinal portion (which are necessarily adjacent one another) will extend at least ½ inch, more preferably 1 inch, and even more preferably four inches in the longitudinal direction of the casing. In the most preferred embodiment, the longitudinal portions are not intermittent, but extend from one end of a length of casing to the other opposing end. In one embodiment of the invention, the first and second longitudinal portions will extend longitudinally (along the length of the casing) for at least twelve inches. In another embodiment of the invention, the longitudinal portion will extend longitudinally for at least 50 feet, preferably 100 feet and most preferably 200 feet. The above-noted embodiments of the invention may be provided as cut lengths of casing, reel stock or as shirred casing.

Generally, for both fibrous and nonfibrous casings, the surface area ratio of the first longitudinal portion of the elongated tube to the second longitudinal portion will be at least 1:1 or greater. Where the first and second longitudinal portions are respectively of substantially uniform transverse dimensions, the surface area ratio may be calculated by measuring the relative transverse widths of the respective portions around the circumference of casing. For example in FIG. 4, measuring the circumferential distance clockwise from edge 58 to edge 57 produces the width of the first longitudinal portion and the clockwise measurement of the distance from edge 57 to edge 58 produces the width for the second longitudinal portion. The ratio of these widths is proportional to the ratio of the respective surface areas when the edges defining each longitudinal portion remain equidistant from one another. Typically, the surface area ratio of the first longitudinal portion to the second longitudinal portion is from about 1:1 to about 120:1 with a ratio range of 1:1 to 20:1 and especially from about 1:1 to about 10:1 being advantageous, particular in nonfibrous embodiments. A most preferred range of about 3.5:1 to about 10:1 is especially desirable for small diameter casing e.g. nonfibrous casing useful in producing frankfurters. Larger diameter casings, e.g. fibrous casing, generally will have a preferred first to second portion surface area ratio of from about 10:1 to about 60:1, and most preferably from about 20:1 to about 40:1.

Beneficially the first longitudinal portion will have a transverse width which comprises at least about 50% of the circumference of the casing. Preferably, for smaller diameter casing (circumference less than 115 mm) this width will be at least 75% and for large diameter casing (circumference greater than 115 mm) this width will be at least 90%.

Any size circumference of nonfibrous casing is suitable, but preferably the casing will have a circumference of from about 1.8 to about 3.8 inches. Similarly, for fibrous casing any circumference will be suitable, but preferably the casing will have a circumference of from about 4.1 to about 21.6 inches.

Advantageously, the inventive casing may utilize a second longitudinal portion which is clear or relatively transparent thereby allowing a food processing operator to visually follow color development during processing or for identification of the contents of the encased products, for example, as to type of product or particle size. Beneficially, such functions are facilitated by the second portion having a transverse width of at least about 3/16 inch, desirably at least about ¼ inch, preferably at least about ⅜ inch, more preferably at least about ½ inch, and most preferably between about ⅜ inch to about ½ inch. Larger widths may also be employed and may be advantageous particularly for larger diameter encased products, especially with fibrous casings having a circumference of about 115 mm or more. Smaller transverse widths are generally more suited for small diameter casings which are intended to be subjected to high speed peeling operations with the attendent problem of unpeeled links.

Figure 5:
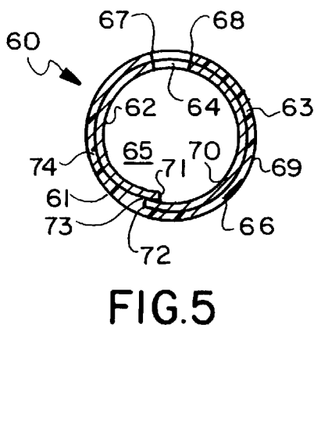
FIG. 5 is a cross-sectional view of an alternative embodiment of the invention.

Referring now to FIG. 5, a cross-sectional view is presented of an alternative fiber-reinforced embodiment of the invention. A fiber-reinforced casing 60 has an outer surface 61, an inner surface 62 with a first longitudinal portion (shown in transverse cross-section) 63 and a second longitudinal portion (shown in transverse cross-section) 64. The continuous inner surface 62 of the tubular casing 60 defines an interior space 65 which in use is stuffed with a food product such as meat emulsion to form a sausage. The outer surface 61 and inner surface 62 define a casing wall 66 which for fibrous casing is typically between about 2.5 to 4.0 mils in thickness. The first longitudinal portion 63 and second longitudinal portion 64 are separated by interfacial edges 67 and 68 and the casing 60 has an outer circumference 69 which may be of any practical size but is preferably at least about 115 mm. The above-noted features, advantages and description made with respect to the nonfibrous casing of FIGS. 3 and 4 generally similarly apply to the fibrous casing 60 of FIG. 5.

Unlike the casing 50 of FIGS. 3 and 4, casing 60 of FIG. 5 is fiber-reinforced with a paper web which has been formed into a paper tube 70 having overlapping ends 71 and 72 which form a lap joint 73. During formation of the fibrous casing 60 viscose impregnates the paper tube 70 and also forms an outer coating 74 of viscose. The viscose helps bond the joint 73 and the viscose is coagulated and regenerated to form regenerated cellulose as described above with respect to FIG. 1. As in FIG. 4, the casing wall thicknesses are exaggerated for illustration as is the thickness of the paper tube 70. Typically, fiber-reinforcements such as paper tube 70 will have a thickness between about 2.5 and 3.5 mils, although thicker or thinner tubes may be employed.

According to the present invention, a cellulosic casing is provided, which may encase a food product such as a sausage. This inventive casing generally comprises an elongated tube, preferably made of a cellulosic material, more preferably regenerated cellulose. Regenerated cellulose may be made by the well known viscose process, however other processes such as the cuprammonium process are known and may be employed. This tubular casing is provided with first and second longitudinal portions at least one of which contains a colorant or opacifier longitudinally and continuously dispersed therein in order to provide a difference in optical values and visual appearance between the first and second portion. These portions have a surface ratio of at least 1:1 or greater of the first portion to the second portion. The differences in visual appearance of the inventive casing and encased sausage may provide an advantageous combination of properties relating to process control, quality control, product identification e.g. with respect to type and quality, and/or an attractive appearance e.g. to attract buyers at point of sale. These advantages and properties have been described above and the inventive casing and/or encased sausage may embody various combinations of these properties or advantages not heretofore seen in the art. The optical differences between the first and second portion of the tubular casing, which give rise to the novel properties and advantages, provide optical values which may be quantified and measured. In particular L,a,b values and opacity may be measured for each individual portion. Hunter L,a,b values are standard color scale values which indicate differences in brightness, hue and saturation using a standard color system which relates lightness as L values, and hue and croma as a combination of a and b values on a coordinate scale where a represents redness-greenness and b represents yellowness-blueness. L,a,b and opacity theory and measurement are further described in the *Instruction Manual Hunter Lab 45°/0° D25-PC2Δ Colorimeter* pp. 1-1 through index-5. (Hunter Associates Laboratory, Inc., April, 1988) which is hereby incorporated by reference. Hunter L,a,b and color scale values and opacity may be measured by the following tests.

L,a,b and Opacity Test

The casing sample to be tested is preferably roll stock having smooth planar surfaces. However, shirred casing may be deshirred, wetted, held under tension and dried to produce a suitable flat film for colorimetric measurement.

Preferred procedures for producing such a flat film for colorimetric measurement from either nonfibrous or fibrous shirred casing are as follows.

For nonfibrous casing, a length of casing is deshirred (e.g. approximately ten inches), cut to provide a tubular length and the flat width (½ of circumference) measured. The deshirred casing length is then soaked in deionized water (about 500 ml) with occasional stirring or agitation for a minimum of five minutes. The soaked casing is then removed from the water and pressed between paper towels to absorb excess water. The one end of the casing is sealed e.g. by tying a knot therein and the casing is inflated with a compressed gas such as oxygen to a circumference which is about three times the previously measured (prior to soaking) flat width and the open end sealed to maintain this inflated condition e.g. by twisting the casing and tying a knot. The inflated casing is then suspended in a convection oven set at about 103° C.±1° C. for a period of time sufficient to dry the casing, preferably to a moisture content between about 13 to 18 weight percent water relative to bone dry cellulose. The moisture content may be measured by using any suitable means including Karl-Fischer analysis. Through trial and error, the appropriate drying time may be determined without undue experimentation. Typically, nonfibrous casing of regenerated cellulose will be dried at about 103° C. for between about 60 to about 120 seconds. The dried casing is opened by cutting longitudinally, preferably along an extrusion fold. The casing now may be flattened to provide a surface which is substantially planar and free from wrinkles caused by shirring. The casing is now ready for measurement of its L,a,b values and opacity. Prior to or after reading the L,a,b values and opacity a moisture reading may also be obtained using e.g. the above-noted moisture analyzer. The above process is repeated with additional casing samples so that an average of four sets of L,a,b and opacity values may be obtained.

For fibrous casing a length of casing is deshirred (e.g. approximately ten inches), and cut to provide a tubular length. The cut length is soaked in deionized water (about 500 ml) with occasional stirring or agitation for a minimum of five minutes. The soaked casing is then removed from the water and pressed between paper towels to absorb excess water. Then the wet casing is cut longitudinally along an extrusion fold and stretched over an appropriately sized hoop. The casing is held in place by fitting thereover a second hoop whose size is adjustable by a screw attachment so as to firmly hold the casing in place. This second hoop is then adjusted to hold the wet casing taut over the first hoop in order to remove any wrinkles and provide a smooth planar surface. The wet casing, held taut by the hoops, is suspended in a convection oven set at about 103° C.±1° C. for a period of time sufficient to dry the casing, preferably to a moisture content of between about 8–12 weight percent based on the weight of bone dry cellulose and paper. The moisture content may be measured by any suitable means e.g. as described above with respect to the method for preparing deshirred nonfibrous casing. Typically, fibrous casing will be dried at 103° C. for about two minutes and then allowed to sit in the open air at room temperature (about 22–25° C.) for about 15 minutes to allow the casing to cool. The dried fibrous casing is substantially planar and free from wrinkles caused by shirring. The cooled casing is cut out of the hoop and the L, a, b values and percent opacity measured as for reel stock. The above deshirring/smoothing process is repeated with additional casing samples so that an average of four values may be obtained.

In order to obtain L, a, b and opacity values of casing free from water-soluble colorants or opacifiers, and additives such as liquid smoke, the casing may be extracted prior to measurement as follows.

A length of reel stock or deshirred fibrous or nonfibrous casing (e.g. about 10 inches) is soaked with about 250 ml of reagent grade methanol for about 10 minutes with occasional stirring or agitation in order to extract any methanol soluble constituents from the casing. The extractant is poured off and the soaking/extraction process repeated with fresh methanol at least two additional times (or more if necessary) to produce a clear wash. The extracted casing is then soaked with 500 ml of deionized water with stirring or agitation for a period of about five minutes and the water wash then poured off. This water washing step is repeated two additional times and then the casing is pressed between paper towels to absorb excess water. The wet casing is then dried as described above with respect to the methods for nonfibrous and fibrous casing.

L,a,b values and opacity are measured using a calorimeter such as a Hunterlab D25-PC2Δ colorimeter available from Hunter Associate Laboratory, Inc. of Reston, Va.

Casing samples are placed on the sample plane of the colorimeter (which is calibrated using standard tiles according to the manufacturer's instructions) where a 45° incident light from a quartz-halogen lamp (clear bulb) illuminates the sample. An optical sensor placed at 0° (perpendicular to the sample plane) measures the reflected light which is filtered to closely approximate CIE 2° Standard Observer for Illuminant C. Values are reported using a standard Hunter L,a,b color scale. Casing sample placement is accomplished as follows. A tubular casing sample is cut open (opposite the seam if any) in the longitudinal direction to form a film having a single thickness. The sight door of the calorimeter is opened. The casing sample is placed on the white tile provided for measuring samples, taking care to avoid locating any seams or folds in the sampling area. The casing and tile are then placed on a spring loaded support which holds the casing and tile in close contact against the sample port which is equipped with a sample port insert having an appropriately sized aperture. The aperture should be no larger than the area to be sampled. The casing is placed with the axis of the longitudinal direction (machine direction) perpendicular to the path of the incident light travelling to the sample from the quartz-halogen lamp light source. The cut casing is generally positioned so that the former exterior surface of the tube is adjacent to the sample port. Alignment of the casing sample is checked through the sight door to avoid dryer folds and obvious defects. The sight door is closed and L,a,b values are measured. The casing sample is then repositioned to a different area of the casing sample and L,a,b values are measured again (taking care to avoid seams and folds). The repositioning and remeasuring is repeated to obtain four sets of values which are averaged.

The opacity (contrast ratio) is a ratio of the diffuse reflectance factor (CIE Y) of the sample backed with black to the diffuse reflectance factor of the same sample backed with white. The black and white backings used are the tiles provided by the calorimeter manufacturer for such purpose. These tiles are also used to calibrate the calorimeter for measuring opacity on a scale of 0–100% (100% being totally opaque). The casing sample is first placed against the white sample tile and measured and then identically positioned against the black sample tile and measured. The percent opacity is then calculated. Two opacity readings at different locations on the sample (avoiding any seams or folds) are made and the average reported. Care is taken during the measurement to ensure that the casing sample is identically positioned on the sample plane for measurement against the black and white backings, respectively. This placement is facilitated by circumscribing a circle on the sample using a template having a slightly larger diameter aperature than the aperature of the sample port insert employed. The operator views the sample through the sight door and adjusts its position so that no portion of the circumscribed circle is visible through the sample port insert aperature in order to properly center the sample. Care is taken to guard against rotation of the casing sample which is always positioned with the axis of the casing in the longitudinal direction (machine direction) being perpendicular to the path of the incident light travelling to the sample from the quartz halogen lamp light source. L,a,b values are also measured with casing samples having a similar alignment with the longitudinal axis of the casing (machine direction) being aligned at a right angle to the path of the illuminating light travelling from the lamp to the sample. This light path is positioned at 45° to the sample plane.

Generally, the invention provides a tubular elongated food casing having first and second longitudinal portions having a surface area ratio of at least about 1:1 or greater of the first portion to the second portion. At least one of these portions has optical values which are different from the other portion by virtue of a colorant or opacifier which is longitudinally and continuously dispersed therein. Various embodiments of this invention having various optical values and ranges with respect to either or both of the first and second portions are described below.

In one embodiment of the invention, the average opacity value of the first portion of the casing tube is at least about 0.5 units greater than the average opacity value of the second portion. For example, a casing having a first portion with an opacity of 3.0% and a second portion with an opacity of 2.5% meets this condition. The average opacity value of the first portion may be greater than the average opacity value of the second portion by at least about 1.0, advantageously at least about 5.0, preferably at least about 10.0, more preferably at least about 20.0 greater. In some embodiments of the invention the average opacity value of the first portion may be greater than that of the second portion by at least 50.0 or beneficially may be at least about 90.0 greater.

In a preferred embodiment of the invention, nonfibrous casing is provided having a second longitudinal portion of the casing having a suitable opacity of less than about 10% preferably less than about 5%, more preferably less than about 2.0% and most preferably less than about 1.5. In this embodiment of the invention a very transparent longitudinal portion is provided to view such characteristics of an encased product as particle definition e.g. of a sausage. When the second longitudinal portion is also relatively colorless in addition to having a low opacity, then the color of the encased product may be easily seen, fat and protein particles differentiated, and/or color development of the encased product (such as meat sausage) observed during processing.

In another preferred embodiment of the invention, fibrous casing is provided having a second longitudinal portion having a suitable opacity of less than about 35%, preferably less than about 25%, and most preferably less than about 20%. Such opacity values in large diameter casings allow visual observation of meat particle definition and help to distinguish product types e.g. to differentiate a beef salami from a turkey roll.

In another embodiment of the present invention there is an optical difference in average opacity between the first and second portions which is suitably less than 50%, preferably less than 20%, most preferably less than 10%, and a difference in average values of either L,a, or b between the first and second longitudinal portions which is suitably at least about 5 units, preferably at least about 10 units, more preferably at least about 20 units, and most preferably at least about 50 units. An advantageous embodiment of the invention may have a difference between the first and second portion in average L,a, or b values of at least about 10 and a difference in average opacity that is less than about 50% and preferably less than about 20.

In another embodiment of the invention, there is a difference in optical properties between the first and second longitudinal portion of a casing whereby the average opacity is suitably at least about 10 or greater, preferably at least about 20, more preferably at least about 50, and most preferably at least about 90, and the sum of the absolute values of a and b of the first portion following extraction of the casing with water and methanol is suitably at least about 10, beneficially at least about 20, preferably at least about 30, more preferably at least about 40, and most preferably at least about 60.

Advantageously, either or both of the first and second longitudinal portions of casing may be a single, continuous portion of substantial optical uniformity. The casing may be in the form of a flattened tube which may be cut in lengths of suitable size for stuffing individual sausages (fibrous casing is often provided this way) or the flattened casing may be wound as reel stock. Alternatively, casing may be gathered into shirred tubes or sticks of casing. Shirred casing is the typical form commercially provided to food processors for nonfibrous casing. Fibrous casing may also be shirred.

In a most preferred embodiment of the invention the first portion of the tube contains a colorant integrally dispersed throughout the tube wall. This colorant preferably is water-insoluble and is also preferably pigment.

Figure 6:
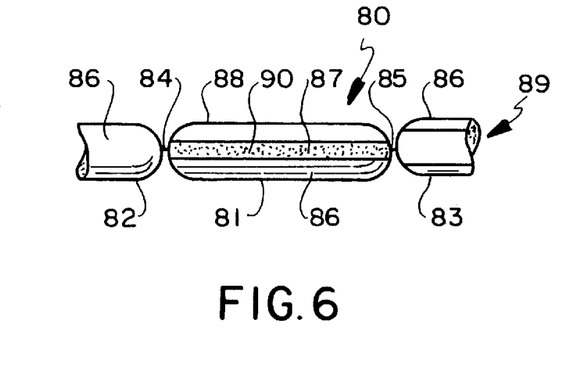
FIG. 6 is a plan view of an encased food product according to the present invention.

Referring now to FIG. 6, a plan view is shown of linked encased sausages 80 according to the present invention. An encased sausage link 81 is connected to opposing links 82, 83 (shown as cut-away sections) by respective twisted casing portions 84, 85 which define the opposing ends of link 81. Each link has a first longitudinal portion 86 and a second longitudinal portion 87. In a most preferred embodiment of the invention the first longitudinal portion is a single continuous portion of substantial optical uniformity and contains a pigmented colorant which is longitudinally and continuously dispersed integrally through the tube wall to provide a sum of the absolute values of a and b of at least about 30 and an opacity of at least about 5%, and the second All of the examples (1–6) are of unshirred (not previously shirred) reel stock casing, although similar values are expected for shirred casing which has been deshirred, wetted, placed under tension and dried as described above.

Table A lists a typical range for casing thickness and moisture content for each example. The actual moisture content and casing thickness was not measured, but is believed to be within the ranges specified. L,a,b and opacity values are expected to be similar over the indicated thickness and moisture ranges.

TABLE A

| Example No. | Casing Type | Moisture Content (%) | Casing Thickness (mil) | Casing Portion | L | a | b | Opacity (%) |
| --- | --- | --- | --- | --- | --- | --- | --- | --- |
| 1 | Clear Nonfibrous Regenerated Cellulose | 13–18 | 0.9–1.1 | — | 83.0 | −1.0 | 3.3 | 1.2 |
| 2 | Blue Tinted Nonfibrous Regenerated Cellulose | 13–18 | 0.9–1.1 | — | 61.7 | −16.8 | −26.7 | 2.3 |
| 3 | Clear Fibrous Regenerated Cellulose | 8–12 | 2.9–3.6 | — | 86.6 | −0.7 | 4.5 | 19.3 |
| 4 | Red Tinted Fibrous Regenerated Cellulose | 8–12 | 2.9–3.6 | — | 32.3 | 58.2 | 14.3 | 44.6 |
| 5 | Nonfibrous Regenerated Cellulose* w/Optically Different Portions | 13–18 | 0.9–1.1 | First+ Second++ | 38.4 83.8 | −9.3 −1.8 | −65.2 0.5 | 10.7 2.0 |
| 6 | Fibrous Regenerated Cellulose** w/Optically Different Portions | 8–12 | 2.9–3.6 | First+ Second++ | 21.2 84.1 | 19.4 0.0 | 7.5 4.7 | 71.4 22.6 |

*Casing had visually and optically different first and second longitudinal portions which had a surface area ratio of about 4:1 of the first portion to the second portion.
**Casing had visually and optically different first and second longitudinal portions which had a surface area ratio of about 10:1 of the first portion to the second portion.
+Value is for first longitudinal portion of casing
++Value is for second longitudinal portion of casing longitudinal portion is relatively transparent (opacity of about 2% or less) with a sum of the absolute values of a and b which is less than 10 and preferably less than 5 and containing no added colorant or opacifier.

Again referring to FIG. 6, the casing tube 88 contains stuffed therein a food product 89 such as sausage emulsion, preferably a processed meat sausage. Second longitudinal portion 87 is preferably clear and relatively colorless (low sum of absolute value for a and b) to allow visible observation of encased food particles 90 and to enable an observer to view encased product type and color.

The invention will become more clear when considered together with the following examples which are set forth as being merely illustrative of the invention and which are not intended, in any manner, to be limitative thereof. Unless otherwise indicated, all parts and percentages are by weight.

EXAMPLES 1–6

L,a,b values and opacity are measured for several nonfibrous and fibrous casings made of regenerated cellulose by the viscose process. These optical values are compared to the L,a,b values and opacity measured for a regenerated cellulose casing made by the viscose process which has optically different first and second longitudinal portions in accordance with the present invention. Table A reports typical average L,a,b and opacity values for various sausage casings as well as for two examples of the present invention. Unless indicated otherwise below, the L,a,b and opacity values are obtained and measured by the procedures described above on page 31.

Examples 1–4 are comparative examples (not of the present invention); whereas Examples 5–6 are of the present invention. The L,a,b values reported in Table A for Examples 1–4 are averages of measurements made on five separate sections of casing with each casing segment being measured at two different locations to provide an average of ten measurements. Examples 5 and 6 are each averages of four measurements made on one sample. The opacity is a similar average of two values of five casing segments for Examples 1–4 and an average of 4 values for a single casing segment for Examples 5 and 6. L,a,b and opacity were both measured on the exterior surface of the casing to obtain the values for each casing segment. Tables B1 and B2 list the measurements from which these averages were obtained.

Example 1 is of a relatively colorless and clear casing of nonfiber-reinforced regenerated celllulose made by a typical commercial viscose process. Example 2 is of a casing similar to that of Example 1, but containing a pigmented copper phthalocyanine colorant which renders the casing transparent blue in appearance. This blue tint is achieved with a nonmigratory colorant. This colorant will not transparent to an encased food product such as a sausage, nor will it wash off during typical sausage processing steps including showering, acid bath, or liquid or gaseous smoke application. Also, it does not deleteriously affect casing permeability and casing continues to be permeable to moisture and smoke. Example 3 is of a relatively colorless casing of fiber-reinforced regenerated cellulose made by a typical viscose process which impregnates a paper tube through the outer surface with viscose which is then regenerated into cellulose. Example 4 is similar to Example 3 but contains a pigmented organic colorant which renders the casing reddish in appearance.

Examples 5 and 6 are of the present invention. Example 5 is of a nonfiber-reinforced cellulosic casing made of regenerated cellulose and having two longitudinal portions with visually different optical properties. The first longitudinal portion contained a copper phthalocyanine pigment identical to that used to color the casing of Example 2. In both instances the pigment was added to viscose prior to regeneration. The difference in L,a,b values is believed due to different loadings used for the two examples. The second longitudinal portion of Example 5 did not contain added colorant and its L,a,b and opacity values were very similar to those for comparative Example 1.

In Example 5, the average opacity value of the first longitudinal portion of the casing was about 8.7 percentage points greater than that of the second longitudinal portion. This difference in average opacity was less than 10 units. Also, the respective differences in average L,a,b values were 45.4, 7.5 and 65.7, respectively. Thus, each average Hunter color scale value for the first and second portion was different by at least 5 units. The L and b values were different by at least 10 units since both showed a difference of well over 20 units. The average b values were different by over 50 units. The first portion of the casing of Example 5 was visually perceptible as being transparent blue in color, while the second portion was perceived as being colorless, transparent and clear.

The casing of Example 5 may advantageously be employed to process food such as sausages. For example, the casing may be stuffed with a meat emulsion such as beef, pork or turkey, cooked, peeled and repackaged for retail sale. The surface area ratio of the first (blue tinted) portion to the second (clear) portion was about 4:1 with the second longitudinal portion having a transverse width of about 9/16 inches. The first portion had a transverse width of about 2 5/16 inches which provides a significant amount of the casing surface area with a coloration of sufficient optical difference from the encased product to provide a visually perceptible indication of the presence of casing to avoid contamination of meat with casing fragments e.g. in the strip-out tub and to show unpeeled or incompletely peeled sausages following the peeling operation. Concurrently, the 9/16 inch wide second portion is sufficient to follow color development during acid showering or smokehouse processing. Also, the meat emulsion may be identified and seen through the relatively clear second portion. A further advantage of the invention is that the color of the first portion may be used to differentiate product type.

Example 6 is of a fiber-reinforced cellulosic casing made from regenerated cellulose and having two longitudinal portions with visually different optical properties. The first longitudinal portion contained an organic brownish-red pigment similar to that used to color the casing of comparative Example 4. In both instances the pigment was added to the viscose prior to regeneration. The difference in L,a,b and opacity values is believed due to differences in pigment loading. The second longitudinal portion did not contain any added colorant and its L,a,b and opacity values are very similar to those for comparative Example 3.

In Example 6, the average opacity value of the first longitudinal portion of the fibrous casing was greater than 10 units and was calculated from measurements to be about 48.8 units (percentage points) greater than the opacity value for the second longitudinal portion. This casing, which did not contain any water or methanol soluble colorants, has a and b values such that the sum of the absolute values of a and b of the first portion was at least 10, and actually was at least about 25 being calculated at 26.9.

The fibrous casing of Example 6 may advantageously be employed to process or package food such as sausages. For example, the casing may be stuffed with meat emulsion, processed and sold in applications where the casing is left on. The surface area ratio of the first (reddish-brown) portion to the second (relatively colorless) portion was about 10:1 with the second longitudinal portion having a transverse width of about 9/16 inches. The first portion had a transverse width of about 5 11/16 inches. The 9/16 inch wide second portion allows a visual indication of food particle definition and to an extent differentiation of product type, while concurrently the colored first portion presents a traditional appearance and allows product identification based upon color.

Referring now to Tables B1 and B2, the actual measured values of L,a,b and opacity are presented in tabular form. These values were used to calculate the averages presented in Table A. The actual values are listed to demonstrate the typical variation presented in casing having a continuously dispersed colorant of substantial optical uniformity. Thus, some variation in measured values is to be expected and may be due to such variables as colorimeter sensitivity, variations in sample presentation on the colorimeter, slight variations in casing thickness or moisture content, slight variations in pigment and viscose mixing and/or viscose aging, etc. Use of the term "substantial optical uniformity" is intended to include such minor variations. Tables B1 and B2 also report values for a double thickness of casing. These values represent the expected changes and variations in measurement which might be expected due to changes in casing thickness and for measurements made of a seam, for example, a lap jointed area of casing. These values are presented for illustrative purposes. Generally, L,a,b color scale values and percent opacity of casing should be measured for a single thickness of casing away from any seam or noticable imperfections such as extrusion or dryer folds, and in a preferred embodiment measurements will avoid, if possible, printed indicia such as words and logos which present discrete noncontinuous optical values.

TABLE B1

| Example No. | Casing Sample | Measurement No. | Single Thickness | | | Double Thickness | | | Single Thickness Opacity (%) | Double Thickness Opacity (%) |
|---|---|---|---|---|---|---|---|---|---|---|
| | | | L | a | b | L | a | b | | |
| 1 | 1 | 1 | 83.2 | −0.6 | 3.0 | 79.4 | −0.8 | 5.6 | 1.2 | — |
| 1 | 1 | 2 | 83.5 | −1.4 | 3.3 | 78.5 | −1.1 | 5.7 | 1.2 | — |

TABLE B1-continued

| Example No. | Casing Sample | Measurement No. | Single Thickness L | a | b | Double Thickness L | a | b | Single Thickness Opacity (%) | Double Thickness Opacity (%) |
|---|---|---|---|---|---|---|---|---|---|---|
| 1 | 2 | 1 | 83.2 | −1.5 | 3.5 | 78.2 | −0.2 | 5.3 | 1.0 | — |
| 1 | 2 | 2 | 83.2 | −1.1 | 3.4 | 78.8 | −1.5 | 6.0 | 1.2 | — |
| 1 | 3 | 1 | 83.2 | −0.8 | 3.3 | 79.5 | −0.9 | 5.3 | 1.0 | — |
| 1 | 3 | 2 | 83.0 | −1.1 | 3.5 | 78.6 | −1.4 | 6.1 | 1.2 | — |
| 1 | 4 | 1 | 82.8 | −1.1 | 3.2 | 79.2 | −1.4 | 5.9 | 1.1 | — |
| 1 | 4 | 2 | 82.7 | −0.8 | 3.2 | 78.3 | −1.8 | 6.2 | 1.5 | — |
| 1 | 5 | 1 | 82.7 | −1.2 | 3.3 | 79.0 | −1.5 | 6.2 | 1.2 | — |
| 1 | 5 | 2 | 82.6 | −0.7 | 3.2 | 79.0 | −1.1 | 5.8 | 1.5 | — |
| 2 | 1 | 1 | 62.2 | −16.8 | −26.3 | 49.0 | −19.2 | −39.9 | 2.3 | — |
| 2 | 1 | 2 | 61.8 | −16.9 | −26.6 | 50.0 | −18.9 | −37.9 | 2.2 | — |
| 2 | 2 | 1 | 62.0 | −17.1 | −26.6 | 49.8 | −19.3 | −38.9 | 2.3 | — |
| 2 | 2 | 2 | 62.3 | −16.8 | −26.0 | 50.1 | −19.0 | −38.2 | 1.9 | — |
| 2 | 3 | 1 | 61.8 | −16.7 | −26.8 | 49.5 | −18.0 | −38.4 | 2.5 | — |
| 2 | 3 | 2 | 61.6 | −17.3 | −26.4 | 49.8 | −18.9 | −38.6 | 2.2 | — |
| 2 | 4 | 1 | 61.2 | −17.0 | −27.2 | 48.7 | −19.0 | −39.6 | 2.5 | — |
| 2 | 4 | 2 | 61.4 | −16.7 | −27.3 | 48.4 | −18.8 | −40.3 | 2.1 | — |
| 2 | 5 | 1 | 61.2 | −16.2 | −27.2 | 49.3 | −19.1 | −38.8 | 2.5 | — |
| 2 | 5 | 2 | 61.7 | −16.8 | −26.6 | 48.7 | −19.0 | −39.6 | 2.2 | — |
| 3 | 1 | 1 | 86.7 | −0.7 | 4.3 | 84.1 | −0.9 | 7.7 | 19.7 | 32.7 |
| 3 | 1 | 2 | 86.8 | −0.7 | 4.4 | 83.6 | −0.8 | 7.7 | 18.9 | 33.5 |
| 3 | 2 | 1 | 86.3 | −0.6 | 4.6 | 84.2 | −0.8 | 7.7 | 19.6 | 34.3 |
| 3 | 2 | 2 | 86.7 | −0.7 | 4.6 | 84.1 | −0.7 | 7.7 | 18.7 | 33.1 |
| 3 | 3 | 1 | 87.1 | −0.7 | 4.4 | 83.9 | −0.8 | 7.6 | 19.1 | 34.2 |
| 3 | 3 | 2 | 86.6 | −0.6 | 4.5 | 83.8 | −0.9 | 7.7 | 18.5 | 33.2 |
| 3 | 4 | 1 | 86.7 | −0.5 | 4.3 | 84.0 | −1.0 | 7.8 | 19.9 | 33.3 |
| 3 | 4 | 2 | 86.5 | −0.7 | 4.4 | 84.1 | −0.9 | 7.7 | 18.9 | 33.3 |
| 3 | 5 | 1 | 86.5 | −0.6 | 4.5 | 84.2 | −0.8 | 7.7 | 20.1 | 34.0 |
| 3 | 5 | 2 | 86.5 | −0.7 | 4.7 | 84.0 | −0.9 | 7.7 | 19.3 | 33.3 |
| 4 | 1 | 1 | 34.0 | 57.3 | 12.8 | 28.2 | 54.4 | 15.7 | 44.1 | 67.0 |
| 4 | 1 | 2 | 33.6 | 57.4 | 13.0 | 28.0 | 55.0 | 15.9 | 45.3 | 69.9 |
| 4 | 2 | 1 | 31.1 | 59.1 | 15.4 | 28.8 | 53.2 | 15.2 | 43.2 | 66.8 |
| 4 | 2 | 2 | 31.1 | 59.1 | 15.4 | 28.6 | 53.7 | 15.4 | 44.0 | 67.6 |
| 4 | 3 | 1 | 34.4 | 56.4 | 12.6 | 28.5 | 53.8 | 15.5 | 43.3 | 67.7 |
| 4 | 3 | 2 | 32.1 | 58.2 | 14.4 | 28.4 | 54.2 | 15.6 | 44.3 | 69.7 |
| 4 | 4 | 1 | 30.8 | 59.3 | 15.6 | 28.4 | 54.1 | 15.6 | 44.3 | 67.4 |
| 4 | 4 | 2 | 30.7 | 59.5 | 15.6 | 28.0 | 55.0 | 16.0 | 44.1 | 70.3 |
| 4 | 5 | 1 | 30.8 | 59.7 | 15.6 | 28.4 | 54.1 | 15.8 | 46.7 | 66.7 |
| 4 | 5 | 2 | 34.3 | 56.4 | 12.6 | 28.1 | 54.8 | 15.9 | 45.6 | 68.9 |

TABLE B2

| Example No. | Casing Sample | Measurement No. | Casing Portion | Single Thickness L | a | b | Single Thickness Opacity (%) |
|---|---|---|---|---|---|---|---|
| 5 | 1 | 1 | First | 38.5 | −9.7 | −65.2 | 10.4 |
| 5 | 1 | 2 | First | 38.5 | −9.3 | −65.2 | 10.9 |
| 5 | 1 | 3 | First | 39.0 | −9.7 | −64.1 | — |
| 5 | 1 | 4 | First | 37.5 | −8.6 | −66.3 | — |
| 5 | 1 | 1 | Second | 84.8 | −1.3 | 1.6 | 1.8 |
| 5 | 1 | 2 | Second | 83.5 | −2.0 | −0.1 | 2.2 |
| 5 | 1 | 3 | Second | 83.1 | −2.3 | −0.2 | — |
| 5 | 1 | 4 | Second | 83.0 | −1.6 | 0.8 | — |
| 6 | 1 | 1 | First | 21.2 | 18.6 | 7.4 | 71.8 |
| 6 | 1 | 2 | First | 21.3 | 18.5 | 7.4 | 70.9 |
| 6 | 1 | 3 | First | 21.0 | 20.6 | 7.7 | — |
| 6 | 1 | 4 | First | 21.3 | 19.8 | 7.5 | — |
| 6 | 1 | 1 | Second | 83.7 | −0.4 | 4.3 | 23.0 |
| 6 | 1 | 2 | Second | 84.8 | 0.2 | 4.7 | 22.2 |
| 6 | 1 | 3 | Second | 84.1 | 0.5 | 5.0 | — |
| 6 | 1 | 4 | Second | 83.9 | −0.2 | 4.9 | — |

EXAMPLES 7–11

L,a,b values and opacity are measured for several nonfibrous and fibrous casings made of regenerated cellulose. Examples 7–10 are comparative examples (not of the present invention) while Example 11 is an example of the present invention. In Examples 7 and 8, measurements were made of reel stock casing. This was unshirred casing that had never been shirred. Examples 9–11, all utilized shirred casing which was deshirred and smoothed according to the process described above on page 31. L,a,b and opacity values were measured for the unshirred and deshirred casings and the data is reported in Table C. This series of examples shows the effects upon L,a,b and opacity measurements of deshirring and smoothing according to the indicated method. The methodology employed was as described above with respect to the L,a,b and opacity test beginning on page 31 except as noted herein. The reel stock casing was measured directly, i.e. no extraction was necessary. Reel stock casing samples are generally smooth enough for direct measurement. The shirred samples were deshirred and smoothed according to the process described above. Five casing samples were tested and two measurements were made for each sample. The L,a,b and opacity values reported in Table C are averages of the ten values measured.

TABLE C

| Example No. | Casing Type | Casing Form | Moisture Content (%) | Casing Thickness (mil) | Casing Portion | L | a | b | Opacity (%) |
|---|---|---|---|---|---|---|---|---|---|
| 7 | Clear Nonfibrous Regenerated Cellulose | Reel Stock | 14 | 1.0 | — | 85.1 | −1.0 | 3.5 | 2.5 |
| 8 | Blue Tinted Nonfibrous Regenerated Cellulose | Reel Stock | 14 | 1.0 | — | 62.1 | −17.6 | −27.9 | 1.3 |
| 9 | Clear Nonfibrous Regenerated Cellulose | Deshirred | 17 | 1.6 | — | 83.6 | −0.7 | 2.9 | 2.8 |
| 10 | Blue Tinted Nonfibrous Regenerated Cellulose | Deshirred | 17 | 1.6 | — | 59.8 | −14.5 | −34.8 | 9.8 |
| 11 | Nonfibrous Regenerated Cellulose* w/Optically Different Portions | Deshirred | 17 | 1.5 | First+ | 68.9 | −13.3 | −18.8 | 6.8 |
|  |  |  |  |  | Second++ | 85.8 | −0.7 | 1.9 | 1.4 |

*Casing had visually and optically different first and second longitudinal portions which had a surface area ratio of about 2.5:1 of the first portion to the second portion.
+Value is for first longitudinal portion of casing
++Value is for second longitudinal portion of casing A comparison of Example 9 with Example 7 demonstrates that L,a,b and opacity values are similar for reel stock (not previously shirred) casing and deshirred casing which has been smoothed by the process described above. Likewise a comparison of Examples 8 and 10 of a blue tinted reel stock and deshirred casing show similar values for L and a. The variation in opacity and b values is believed to be due to slightly different loadings of pigment in the casing samples measured.

Example 11 of the present invention shows a second longitudinal portion (which had no added colorant) which presented L,a,b and opacity values very similar to those for Examples 7 and 9 which also did not contain any added colorant. The first longitudinal portion of Example 11 had L,a,b and opacity values indicative of the colorant employed in Examples 8 and 10. Differences in values are believed to be primarily due to different pigment loadings.

Examples 7–11 and particularly the comparison of the "no colorant added" portion of Example 11 with Examples 7 and 9 are believed to demonstrate that similar L,a,b and opacity values may be obtained for unshirred casing and deshirred casing, which casing is otherwise the same by following the test procedures described herein. Variations in colorant loading and other parameters such as casing moisture and thickness may have an effect on the values measured.

The inventive nonfibrous casing of Example 11 had an average difference in opacity between the first and second portions of 5.4 with the first portion being more opaque (greater opacity value). The difference in L,a, and b values between the first and second portion were 16.9, 12.6 and 20.7, respectively. The "clear" second longitudinal portion had a transverse width of about 9/16 inch and the blue tinted first portion had a transverse width of about 1 7/16 inch. The surface area ratio of the first longitudinal portion to the second longitudinal portion was about 2.5:1. This nonfibrous casing was suitable for stuffing with food products such as meat sausage and had the advantages described above with respect to the nonfibrous reel stock casings of Example 5.

In view of the above examples, and the description and the drawings, different embodiments, modifications and changes will be apparent to those skilled in the art and all such modifications, embodiments and changes are deemed to be within the scope of the invention as defined by the following claims.

What is claimed is:

1. A cellulosic food casing comprising an elongated cellulosic thin walled tube having a moisture content of less than 100 wt. % based upon the weight of bone dry cellulose (BDC), said tube having first and second longitudinal portions, and a colorant or opacifier which is longitudinally and continuously dispersed in at least said first portion throughout said tube wall to provide said portion with optical values which are different from said other portion, said portions having a surface area ratio of said first portion to said second portion of at least about 1:1 or greater, and wherein said first and second portions have Hunter L, a, b values and opacity values which values meet at least one of the following conditions:

I) an average opacity value of said first portion that is at least about 0.5 greater than the average opacity value of said second portion;

ii) a difference in average opacity between said first portion and said second portion which is less than 10, and a difference between said first and second portions in their respective averages of either said L values or said a values or said b values of at least about 5; or iii) a difference of at least about 10 or greater in average opacity between said first portion and said second portion, and the sum of the absolute values of a and b of the first portion following extraction of said casing with water and methanol is at least 10.

2. A casing, as defined in claim 1, wherein said casing has an average opacity value of said first portion that is at least about 0.5 greater than the average opacity value of said second portion.

3. A casing, as defined in claim 1, wherein said casing has a difference in average opacity between said first portion and said second portion which is less than 10 and a difference of at least about 5 between said first and second portions in their respective averages of either said L values or said a values or said b values.

4. A casing, as defined in claim 1, wherein said casing has a difference of at least about 10 or greater in average opacity between said first portion and said second portion and the sum of the absolute values of a and b of the first portion following extraction of said casing with water and methanol is at least 10.

5. A casing, as defined in claim 2, wherein said average opacity value of said first portion is at least about 1.0 greater than the average opacity value of said second portion.

6. A casing, as defined in claim 2, wherein said average opacity value of said first portion is at least about 20.0 greater than the average opacity value of said second portion.

7. A casing, as defined in claim 2, wherein said average opacity value of said first portion is at least about 90.0 greater than the average opacity value of said second portion.

8. A casing, as defined in claim 3, wherein said difference in either L, a, or b values is at least about 10.

9. A casing, as defined in claim 3, wherein said difference in either L, a, or b values is at least about 20.

10. A casing, as defined in claim 3, wherein said difference in either L, a, or b values is at least about 50.

11. A casing, as defined in claim 8, wherein said difference in average opacity is less than about 20.

12. A casing, as defined in claim 8, wherein said difference in average opacity is less than about 50.

13. A casing, as defined in claim 4, wherein said difference in average opacity is at least about 20.

14. A casing, as defined in claim 4, wherein said difference in average opacity is at least about 90.

15. A casing, as defined in claim 4, wherein said sum of the absolute values of a and b is at least 30.

16. A casing, as defined in claim 4, wherein said sum of the absolute values of a and b is at least 60.

17. A casing, as defined in claim 1, wherein said first longitudinal portion has a transverse width which comprises at least about 50% of the circumference of said casing.

18. A casing, as defined in claim 1, wherein said first longitudinal portion has a transverse width which comprises at least about 75% of the circumference of said casing.

19. A casing, as defined in claim 1, wherein said first longitudinal portion has a transverse width which comprises at least about 90% of the circumference of said casing.

20. A casing, as defined in claim 1, wherein said surface ratio of said first portion to said second portion is from about 1:1 to about 120:1.

21. A casing, as defined in claim 1, wherein said surface ratio of said first portion to said second portion is from about 1:1 to about 20:1.

22. A casing, as defined in claim 1, wherein said surface ratio of said first portion to said second portion is from about 1:1 to about 10:1.

23. A casing, as defined in claim 1, wherein said surface ratio of said first portion to said second portion is from about 3.5:1 to about 10:1.

24. A casing, as defined in claim 1, wherein said surface ratio of said first portion to said second portion is from about 10:1 to about 60:1.

25. A casing, as defined in claim 1, wherein said surface ratio of said first portion to said second portion is from about 20:1 to about 40:1.

26. A casing, as defined in claim 1, wherein said second longitudinal portion has a transverse width of at least 3/16 inch.

27. A casing, as defined in claim 1, wherein said second longitudinal portion has a transverse width of at least 1/4 inch.

28. A casing, as defined in claim 1, wherein said second longitudinal portion has a transverse width of at least 3/8 inch.

29. A casing, as defined in claim 1, wherein said second longitudinal portion has a transverse width of at least 1/2 inch.

30. A casing, as defined in claim 1, wherein said second longitudinal portion has a transverse width of from about 3/8 inch to about 1/2 inch.

31. A casing, as defined in claim 1, wherein said casing comprises nonfiber-reinforced regenerated cellulose.

32. A casing, as defined in claim 1, wherein said casing comprises fiber-reinforced regenerated cellulose.

33. A casing, as defined in claim 1, wherein said casing has a circumference of from about 1.8 to about 3.8 inches.

34. A casing, as defined in claim 1, wherein said casing has a circumference of from about 4.1 to about 21.6 inches.

35. A casing, as defined in claim 31, wherein said second portion of said casing has an opacity of less than about 2.0.

36. A casing, as defined in claim 31, wherein said second portion of said casing has an opacity of less than about 1.5.

37. A casing, as defined in claim 32, wherein said second portion of said casing has a opacity of less than about 35.

38. A casing, as defined in claim 32, wherein said second portion of said casing has a opacity of less than about 20.

39. A casing, as defined in claim 1, wherein said second portion is a single, continuous portion of substantial optical uniformity.

40. A casing, as defined in claim 1, wherein said first portion is a single continuous portion of substantial optical uniformity.

41. A casing, as defined in claim 31, wherein said casing has a thickness between about 0.7 and about 2.0 mils.

42. A casing, as defined in claim 32, wherein said casing has a thickness between about 2.5 and about 4.0 mils.

43. A casing, as defined in claim 31, wherein said casing has a moisture content of between about 20% to about 40% BDC.

44. A casing, as defined in claim 32, wherein said casing has a moisture content of between about 4% to about 25% BDC.

45. A casing, as defined in claim 32, wherein said casing has a moisture content of between about 26% to about 70% BDC.

46. A casing, as defined in claim 1, wherein said casing is shirred.

47. A casing, as defined in claim 1, wherein said first portion of said tube contains a colorant integrally dispersed throughout the tube wall.

48. A casing, as defined in claim 47, wherein said colorant is a water-insoluble pigment.

49. A casing, as defined in claim 1, further comprising a food product contained within said tube.

50. A casing as defined in claim 49, wherein said casing is nonfibrous and said food product is meat emulsion.

51. A casing, as defined in claim 1, wherein said first and second longitudinal portions extend continuously lengthwise from one end of said casing to the opposing end.

52. A casing, as defined in claim 1, having a length of at least one foot.

53. A casing, as defined in claim 1, wherein said tube comprises regenerated cellulose and said colorant or opacifier is dispersed therein prior to regeneration.

54. A casing, as defined in claim 53, wherein said regenerated cellulose is made from viscose which contains in a portion thereof said colorant or opacifier.

55. A food casing comprising a shirred elongated tube of at least 50 feet in length having adjacent first and second longitudinal portions of at least four inches in length wherein at least one colorant or opacifier is dispersed in at least one of said portions throughout a wall of said tube to provide it with optical values which are different from the other portion, and wherein the second portion has a transverse width less than or equal to that for said first portion and said first and second portions have Hunter L,a,b values and opacity values meeting at least one of the following conditions:

I) an average opacity value of said first portion that is at least about 0.5 greater than the average opacity value of said second portion;

ii) a difference in average opacity between said first portion and said second portion which is less than 10, and a difference between said first and second portions in their respective averages of either said L values or said a values or said b values of at least about 5; or iii) a difference of at least about 10 or greater in average opacity between said first portion and said second portion, and the sum of the absolute values of a and b of the first portion following extraction of said casing with water and methanol is at least 10.

56. A casing, as defined in claim 55, wherein said tube is a fiber-reinforced tube of regenerated cellulose.

57. A casing, as defined in claim 55, wherein said tube is a nonfiber-reinforced tube of regenerated cellulose.

58. A casing, as defined in claim 55, wherein said tube has an average thickness of less than about 4 mils.

59. A casing, as defined in claim 55, wherein said tube has an average thickness of less than about 2.0 mils.

60. A peelable food casing for formation of skinless frankfurters comprising a shirred nonfiber-reinforced elongated tube having adjacent first and second longitudinal portions of at least 50 feet in length wherein at least one colorant or opacifier is dispersed in at least one of said portions throughout a wall of said tube to provide it with optical values which are different from the other portion, and wherein the second portion has a transverse width less than that for said first portion and said first and second portions have Hunter L,a,b values and opacity values meeting at least one of the following conditions:

i) an average opacity value of said first portion that is at least about 0.5 greater than the average opacity value of said second portion;

ii) a difference in average opacity between said first portion and said second portion which is less than 10, and a difference between said first and second portions in their respective averages of either said L values of said a values or said b values of at least about 5; or iii) a difference of at least about 10 or greater in average opacity between said first portion and said second portion, and the sum of the absolute values of a and b of the first portion following extraction of said casing with water and methanol is at least 10; and wherein said tube has a tube wall thickness between about 0.8 to about 2.0 mils and a tube circumference less than 115 mm with said second longitudinal portion having an opacity of less than about 5.0% and a transverse width of at least about 3/16 inch.

61. A food casing, as defined in claim 60, wherein said colorant comprises a water-insoluble blue pigment.

62. A food casing, as defined in claim 61, wherein said tube comprises a cellulosic material.

63. A high-speed machine peelable sausage casing comprising a shirred elongated cellulosic tube having adjacent first and second longitudinal portions of at least 50 feet in length wherein non-migratory water-insoluble pigment is incorporated in said first portion of said cellulose casing by dispersion in a wall of said tube to provide it with optical values which are different from said second portion, and wherein said second portion is clear and colorless having an opacity of less than 5.0% and a transverse width of at least 3/16 inch, but less than the width of said first portion and said first and second portions have L,a,b and opacity values meeting at least one of the following conditions:

i) an average opacity value of said first portion that is at least about 0.5 greater than the average opacity value of said second portion;

ii) a difference in average opacity between said first portion and said second portion which is less than 10, and a difference between said first and second portions in their respective averages of either said L values or said a values or said b values of at least about 5; or iii) a difference of at least about 10 or greater in average opacity between said first portion and said second portion, and the sum of the absolute values of a and b of the first portion following extraction of said casing with water and methanol is at least 10.

64. A casing, as defined in claim 63, wherein said tube has a tube wall thickness between about 0.8 to about 2.0 mils and a tube circumference less than 115 mm.

65. A casing, as defined in claim 64, wherein said casing is made of cellulose regenerated from pigment-containing viscose.

* * * * *